US011928877B2

(12) United States Patent
Venkatesh et al.

(10) Patent No.: US 11,928,877 B2
(45) Date of Patent: Mar. 12, 2024

(54) SYSTEMS AND METHODS FOR AUTOMATIC CONTEXT-BASED ANNOTATION

(71) Applicant: Nationstar Mortgage LLC, Coppell, TX (US)

(72) Inventors: Goutam Venkatesh, Irving, TX (US); Sudhir Sundararam, Irving, TX (US); Zach Rusk, Flower Mound, TX (US)

(73) Assignee: Nationstar Mortgage LLC, Coppell, TX (US)

( * ) Notice: Subject to any disclaimer, the term of this patent is extended or adjusted under 35 U.S.C. 154(b) by 0 days.

(21) Appl. No.: 16/990,900

(22) Filed: Aug. 11, 2020

(65) Prior Publication Data

US 2022/0051009 A1 Feb. 17, 2022

(51) Int. Cl.
*G06V 30/412* (2022.01)
*G06V 10/30* (2022.01)
*G06V 10/44* (2022.01)
*G06V 30/10* (2022.01)

(52) U.S. Cl.
CPC ............ *G06V 30/412* (2022.01); *G06V 10/30* (2022.01); *G06V 10/44* (2022.01); *G06V 30/10* (2022.01); *G06V 2201/10* (2022.01)

(58) Field of Classification Search
CPC .. G06K 9/00449; G06K 9/40; G06K 2209/01; G06K 9/00442; G06K 9/00483
See application file for complete search history.

(56) References Cited

U.S. PATENT DOCUMENTS

| 6,738,517 B2 * | 5/2004 | Loce ................. H04N 1/40062 |
| | | 382/209 |
| 9,058,382 B2 | 6/2015 | Liu et al. |
| 10,354,134 B1 * | 7/2019 | Becker ................. G06V 30/413 |
| 2006/0218134 A1 * | 9/2006 | Simske ................. G06F 16/35 |
| 2009/0092320 A1 * | 4/2009 | Berard ................. G06V 30/40 |
| | | 382/209 |
| 2010/0082642 A1 | 4/2010 | Foreman et al. |

(Continued)

OTHER PUBLICATIONS

CN 111986789 (English translation) ; Liming et al. Aug. 26, 2020 (Year: 2020).*

(Continued)

*Primary Examiner* — Nancy Bitar
(74) *Attorney, Agent, or Firm* — Volpe Koenig (57) ABSTRACT

In some aspects, the disclosure is directed to methods and systems for automatic context-based annotation by leveraging a priori knowledge from annotations in template documents. A large library of template documents may be generated and pre-processed in many implementations to identify annotations or other inclusions commonly present on documents related to or conforming to the template. Newly scanned documents may be compared to these templates, and when a similar template is identified, annotation locations and types from the template may be applied to the newly scanned document to recognize and classify annotations and inclusions. To increase efficiency and provide scalability, comparisons of scanned documents and template documents may be distributed amongst a plurality of computing devices for processing in parallel, with similarity results aggregated.

20 Claims, 5 Drawing Sheets

(56) References Cited

U.S. PATENT DOCUMENTS

| | | | |
|---|---|---|---|
| 2014/0072219 A1* | 3/2014 | Tian .................... | G06V 30/162 |
| | | | 382/190 |
| 2016/0239711 A1* | 8/2016 | Gong .................. | G06V 40/173 |
| 2020/0074169 A1* | 3/2020 | Mukhopadhyay ...... | G06F 18/22 |
| 2020/0274990 A1* | 8/2020 | Berfanger ............... | G06T 7/194 |

OTHER PUBLICATIONS

International Preliminary Report on Patentability issued in International Application No. PCT/US2021/045505, dated Feb. 7, 2023.

\* cited by examiner

SYSTEMS AND METHODS FOR AUTOMATIC CONTEXT-BASED ANNOTATION

FIELD OF THE DISCLOSURE

This disclosure generally relates to systems and methods for computer vision and image classification. In particular, this disclosure relates to systems and methods for automatic context-based annotation for structured and semi-structured documents.

BACKGROUND OF THE DISCLOSURE

Identifying and classifying important items in scanned images of documents is particularly difficult for computer-based systems, because the items of interest may be widely distributed across the page, and may appear in different locations on different pages or documents, depending on the source. For example, a date on a document may appear in the upper left on a first document, an upper right on a second document, and a lower right on a third document, and may be formatted differently, utilize different fonts and/or sizes, etc. Furthermore, some documents may have additional annotations or inclusions, such as stamps, embossing, watermarks, handwritten notes, etc., all of which may adversely affect image recognition and classification.

BRIEF DESCRIPTION OF THE DRAWINGS

Various objects, aspects, features, and advantages of the disclosure will become more apparent and better understood by referring to the detailed description taken in conjunction with the accompanying drawings, in which like reference characters identify corresponding elements throughout. In the drawings, like reference numbers generally indicate identical, functionally similar, and/or structurally similar elements.

The details of various embodiments of the methods and systems are set forth in the accompanying drawings and the description below.

DETAILED DESCRIPTION

For purposes of reading the description of the various embodiments below, the following descriptions of the sections of the specification and their respective contents may be helpful:

Section A describes embodiments of systems and methods for automatic context-based annotation; and Section B describes a computing environment which may be useful for practicing embodiments described herein.

A. Automatic Context-Based Annotation

Figure 1:
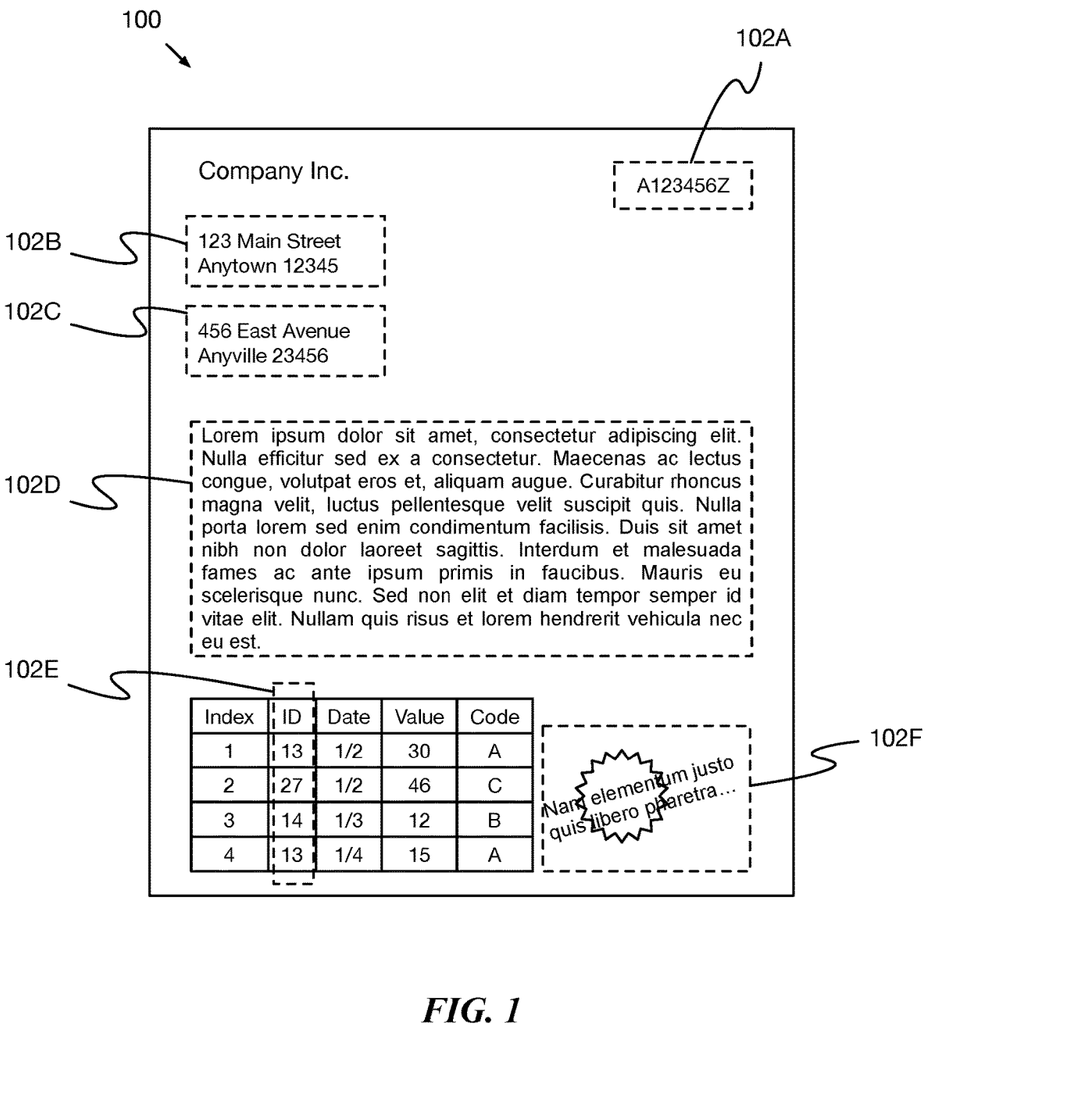
FIG. 1 is an illustration of an example document having annotations, according to some implementations.

Documents in paper form are frequently scanned by computer systems for archival purposes, classification, data retrieval, analysis, or other functions. For example, referring briefly to FIG. 1, illustrated is a scan of an example document 100, according to some implementations. The document may include various features 102A-102F which may be useful for analysis, classification, or other purposes, such as addresses 102B-102C, dates, values or codes 102A, 102E, or other such information. Identifying and classifying important items in scanned images of documents is particularly difficult for computer-based systems, because the items of interest may be widely distributed across the page, and may appear in different locations on different pages or documents, depending on the source. For example, a date on a document may appear in the upper left on a first document, an upper right on a second document, and a lower right on a third document, and may be formatted differently, utilize different fonts and/or sizes, etc. Furthermore, some documents may have additional annotations or inclusions 102F, such as stamps, embossing, watermarks, handwritten notes, etc., all of which may adversely affect image recognition and classification. The inclusions may be of different scales or rotations, and may be partially incomplete in many implementations (e.g. where a stamp or embossing is only partially present within a scanned image).

Some classification attempts utilize optical character recognition and natural language processing to parse an entire document (e.g. converting text in the document to a string, and applying regular expression filters to identify keywords). However, such implementations may be inaccurate, may be unable to deal with codes or numeric values, and may confuse similar but different documents, particularly with documents from a large collection of sources. Furthermore, in some implementations, documents may include non-standard labels for annotations that may confuse such processing attempts (e.g. "period" rather than "date range", or similar labels).

The systems and methods discussed herein provide an improvement to computer vision and image analysis by leveraging a priori knowledge from annotations in template documents. A large library of template documents may be generated and pre-processed in many implementations to identify annotations or other inclusions commonly present on documents related to or conforming to the template. Newly scanned documents may be compared to these templates, and when a similar template is identified, annotation locations and types from the template may be applied to the newly scanned document to recognize and classify annotations and inclusions. Many different templates may be created for documents, including templates for different sources of documents, different types of documents, and even different pages within multi-page documents (e.g. a template for a first page of a document, a different template for middle pages of the document, and a still different template for a last page of the document). To increase efficiency and provide scalability, comparisons of scanned documents and template documents may be distributed amongst a plurality of computing devices for processing in parallel, with similarity results aggregated.

In brief overview, implementations of the systems and methods discussed herein receive a scanned or captured image of a page or document, referred to as a candidate image. In some implementations, the candidate image may be pre-processed, such as by scaling, normalizing, downsampling, filtering noise, or otherwise preparing the image for comparison. Structural features within the image may be detected, such as lines, boxes, text locations, etc. In some implementations, this may be done by performing edge detections (e.g. by detecting horizontal and edges, e.g. via a filtering with a Sobel operator or Laplacian operator, applying a canny edge detector, etc.). In some implementations, unwanted pixels may be removed by conducting local maxima analysis on each pixel to filter the edge detection results. In some implementations, a hysteresis threshold may be applied using minimum and maximum values across a window or range of pixels, to filter out non-edges. Images captured from template documents may be similarly pre-processed and undergo feature extraction. The extracted features of the candidate image may be compared to extracted features of each of the template document images, and a similarity score calculated. A template document having a highest similarity score may be identified, and the locations of annotations (including sizes or dimensions and coordinates) within the template document may be applied to the candidate document. The image of the candidate document may then be associated with these annotations (including, in some implementations, capturing images of or extracting alphanumeric characters within each annotation region, and storing the image or extracted characters in association with the candidate document).

Figure 2:
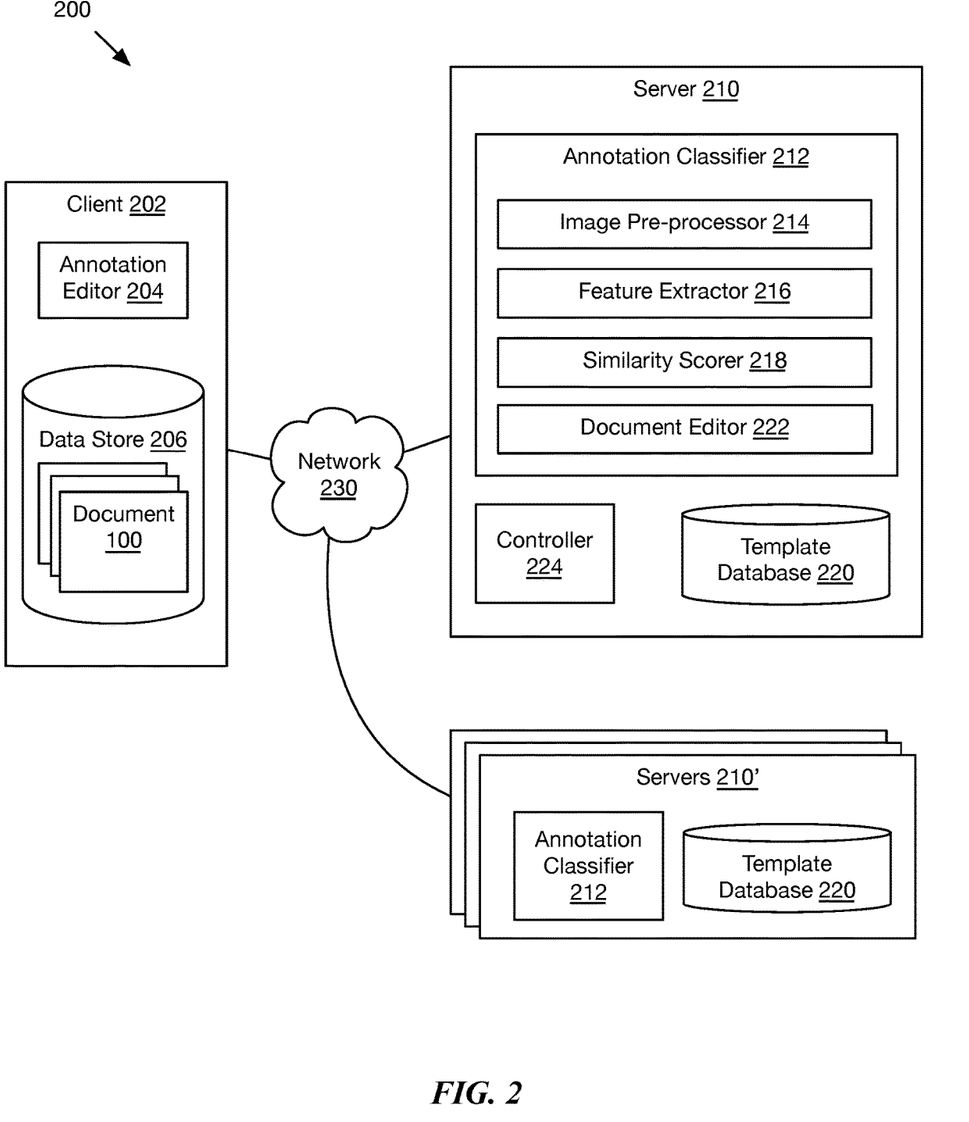
FIG. 2 is a block diagram of a system for automatic context-based annotation, according to some implementations.

Referring now to FIG. 2, illustrated is a block diagram of a system 200 for automatic context-based annotation, according to some implementations. In many implementations, one or more servers 210, 210' may communicate via a network 230 with each other and/or with one or more client devices 202. Client devices 202 and/or servers 210, 210' may comprise desktop computing devices, laptop computing devices, rackmount computing devices, tablet computing devices, wearable computing devices, embedded computing devices, appliances or clusters of appliances, or any other type and form of computing device. In some implementations, client devices 202 and/or servers 210, 210' may comprise virtual computing devices executed by one or more computing devices (e.g. a cloud of virtual machines). Client devices 202 and servers 210, 210' may comprise processors, memory, network interfaces, and/or other devices, as discussed in more detail below. Client devices 202 and servers 210, 210' may communicate via one or more networks 230, which may comprise a local area network (LAN), wide area network (WAN) such as the Internet, a cellular network, a broadband network, a satellite network, or any other type and form of network or combination of networks. Network 230 may include other devices not illustrated, including firewalls, switches, routers, access points, gateways, network accelerators, caches, or other such devices.

Client devices 202 and/or other devices may store documents 100 in a data store 206, which may comprise an internal or external storage device, including network storage devices. Documents 100 or images of documents 100 may be in any suitable format, including uncompressed images or compressed images (e.g. JPEG or PNG compressed images), or other formats. Documents 100 may comprise multi-page documents (e.g. a multi-page PDF file) or single page documents.

Client devices 202 may execute an annotation editor 204, which may comprise an application, server, service, daemon, routine, or other executable logic for communicating with an annotation classifier 212 of a server 210, and for providing candidate documents or images of candidate documents to an annotation classifier 212. In some implementations, annotation editor 204 may comprise a web browser application, and an annotation classifier 212 (discussed in more detail below) may comprise a web server or application server for providing a web application or Software-as-a-Service (SaaS) application. In some implementations, annotation editor 204 may allow a user to edit or modify annotations generated by an annotation classifier 212, as discussed below.

In some implementations, a server 210 or processor of a server 210 may execute an annotation classifier 212. Annotation classifier 212 may comprise an application, server, service, daemon, routine, or other executable logic for receiving candidate images of documents 100 (or for receiving documents 100 and generating candidate images), pre-processing the candidate images, extracting features from the candidate images, and classifying the images according to similarity to one or more template documents. For example, in some implementations, an annotation classifier 212 may receive a document or image of a document 100 (e.g. a scan, screen capture, photo, or other such image) from a client device 202 or another device. In some implementations in which documents are received in non-image formats (e.g. PDFs, word processing documents with embedded images, etc.), annotation classifier 212 may convert the document to an image (e.g. via rendering of a screen capture, exporting images, etc.). In some implementations in which documents have multiple pages, annotation classifier 212 may separate the document into multiple single-page documents or images.

Annotation classifier 212 may comprise an image pre-processor 214. Image pre-processor 214 may comprise an application, server, service, daemon, routine, or other executable logic for preparing a candidate image for comparison and classification. In some implementations, image pre-processor 214 may scale candidate images to a predetermined size (e.g. 1500×1500 pixels, or any other such size) corresponding to a size used for template images. In some implementations, scaling candidate images may include stretching or shrinking a candidate image to the predetermined size, while in other implementations, scaling images may include padding a candidate image (e.g. adding black or white pixels to a border of the image to increase its size to the predetermined size) or cropping a candidate image. In some implementations, image pre-processor 214 may downsample a candidate image or convert the candidate image to grayscale from color, reduce a resolution of the candidate image, apply a noise filter (e.g. a 5×5 Gaussian noise filter) or similar filter to reduce noise or smooth variations in the candidate image, or otherwise process the candidate image for classification.

Annotation classifier 212 may also comprise a feature extractor 216. Feature extractor 216 may comprise an application, server, service, daemon, routine, or other executable logic for detecting structural features of a candidate image. In some implementations, structural features may refer to edges, borders, separated groups of alphanumeric characters, shapes, or other such features. For example, in some implementations, feature extractor 216 may identify edges within candidate images to detect structural features. In some such implementations, feature extractor 216 may use an edge detection filter, such as a Sobel filter or Laplacian filter, in both horizontal and vertical directions to get an edge gradient in both directions for each pixel in the image. A local maxima analysis may be applied to remove unwanted pixels, and in some implementations, hysteresis thresholding may be applied with a minimum and maximum value to remove non-edges or false positive edges. The detected edges may then be used as extracted features for comparison to template images. This may significantly reduce the complexity of classification versus comparing the entire image to template images, and make the overall classification and annotation process much faster.

For example, in many implementations, the same feature extraction process (and pre-processing) may be performed on a collection of documents representing typical documents of various types (e.g. template documents), which may be artificially created or may be gathered from actual documents that have been previously classified and annotated. The processed and edge detected images of the template documents may be stored in a template database 220 and accessible by the annotation classifier 212. These may be stored in association with identifications of each annotation, along with identifications of locations of each annotation (e.g. coordinates, dimensions, etc.). For example, in some implementations, a processed and edge-detected template image (e.g. template1.jpg) may be associated with a corresponding set of annotation coordinates (e.g. in a template1.json file, XML, data file, or similar data structure). In some implementations, a set of alphanumeric labels may be similarly stored in association with the image and coordinate data (e.g. in a template1.txt file or similar file). In many implementations, template documents may be processed well in advance of classifying candidate images, and processing may be distributed amongst a plurality of servers 212' for scalability and efficiency.

Annotation classifier 212 may include a similarity scorer 218. Similarity scorer 218 may comprise an application, server, service, daemon, routine, or other executable logic for comparing a feature-extracted or edge-detected candidate image with similarly feature-extracted or edge-detected template images. As discussed above, by reducing the candidate image and template images to extracted features or edges, the comparison process may be significantly simplified, reducing the time taken to perform each comparison. Similarity scorer 218 may calculate a structural similarity (SSIM) between the candidate image and a template image. For example, in some implementations, structural similarity may be calculated as a weighted combination of luminance, contrast, and structure comparisons between the candidate image and template image (e.g. based on the average, variance, and covariance of sliding windows or blocks across the image). The SSIM may be calculated as a correlation coefficient with a range of 0 to 1 or 0 to 100%, with 0 indicating no structural similarity and 1 or 100% indicating identical structures. In some implementations, a complex wavelet SSIM may be utilized to account for rotation or translation in the candidate image.

To provide scalability and reduce the time for the comparison, the collection of template images may be divided amongst a plurality of servers 210' with each providing similarity scores for a subset of template images of the collection. Controller 224 may comprise an application, server, service, daemon, routine, or other executable logic for providing the feature extracted or edge detected candidate image to a plurality of servers 210' and for receiving and aggregating similarity scores from the plurality of servers 210'. Although shown separate from annotation classifier 212, in many implementations, controller 224 may be part of the annotation classifier 212 or executed as a subroutine by the annotation classifier 212. In some implementations, controller 224 may provide an identification of a subset of templates with which a candidate image should be compared (e.g. providing a first server 210' with an identification of templates 1-100, providing a second server 210' with an identification of templates 101-200, etc.), while in other implementations, each server 210' may store in a local template database 220 a different subset of the template images and may compare the candidate image to each template image in its local template database 220. Each server 210' may provide the controller 224 with an indexed set of similarity scores (e.g. "template 1; 75%; template 2: 20%; template 3: 95%; etc.), and the controller 224 may aggregate the set of scores to identify the highest scoring or most similar template image. In some implementations, to reduce memory and bandwidth requirements, only scores above a threshold (e.g. 90%) may be included in each indexed set, with others discarded. The annotation classifier 212 of the controller server may select the template image with the highest similarity score of the aggregated set of similarity scores as being a likely match for the candidate image and document.

Annotation classifier 212 may include a document editor 222. Document editor 222 may comprise an application, server, service, daemon, routine, or other executable logic for modifying a candidate document according to annotations associated with a selected template image (e.g. locations and dimensions of annotations and text labels for each annotation). For example, in some implementations, document editor 222 may add annotations and/or labels from the selected template document to metadata of the candidate document. In other implementations, the document editor 222 may add annotations to the candidate image (e.g. the original candidate image, before pre-processing or feature extraction) directly (e.g. highlighting annotation regions with a semi-transparent overlay or color, adding boxes around annotation regions, adding text labels adjacent to each annotation region, etc.). The modified candidate image may be provided to the client device 202 for viewing (and in some implementations editing) in an annotation editor 204 or other such application.

In some implementations, document editor 222 may perform optical character recognition on the candidate image for each annotation region identified in the selected template (e.g. within a region defined by coordinates or dimensions for the annotation), and may in some implementations, apply natural language processing or apply a regular expression filter to extracted characters from the annotation region. This may avoid performing such OCR and processing to the entire document, or may limit the amount of data to be processed to a small amount corresponding to the annotation region. In some implementations, such processing or filtering may be specific to the annotation type. For example, a first regular expression filter may be used to process alphanumeric characters extracted from a first annotation region, while a second regular expression filter may be used to process alphanumeric characters extracted from a second annotation region. Such filters may be specified in the template document or associated annotation document (e.g. JSON file, XML file, etc.). This may allow for more specific processing for different types of annotations that conform to different syntaxes and rules (e.g. dates, addresses, identification codes, etc.). In some implementations, the extracted and processed text may be added to metadata of the candidate document.

Figure 3:
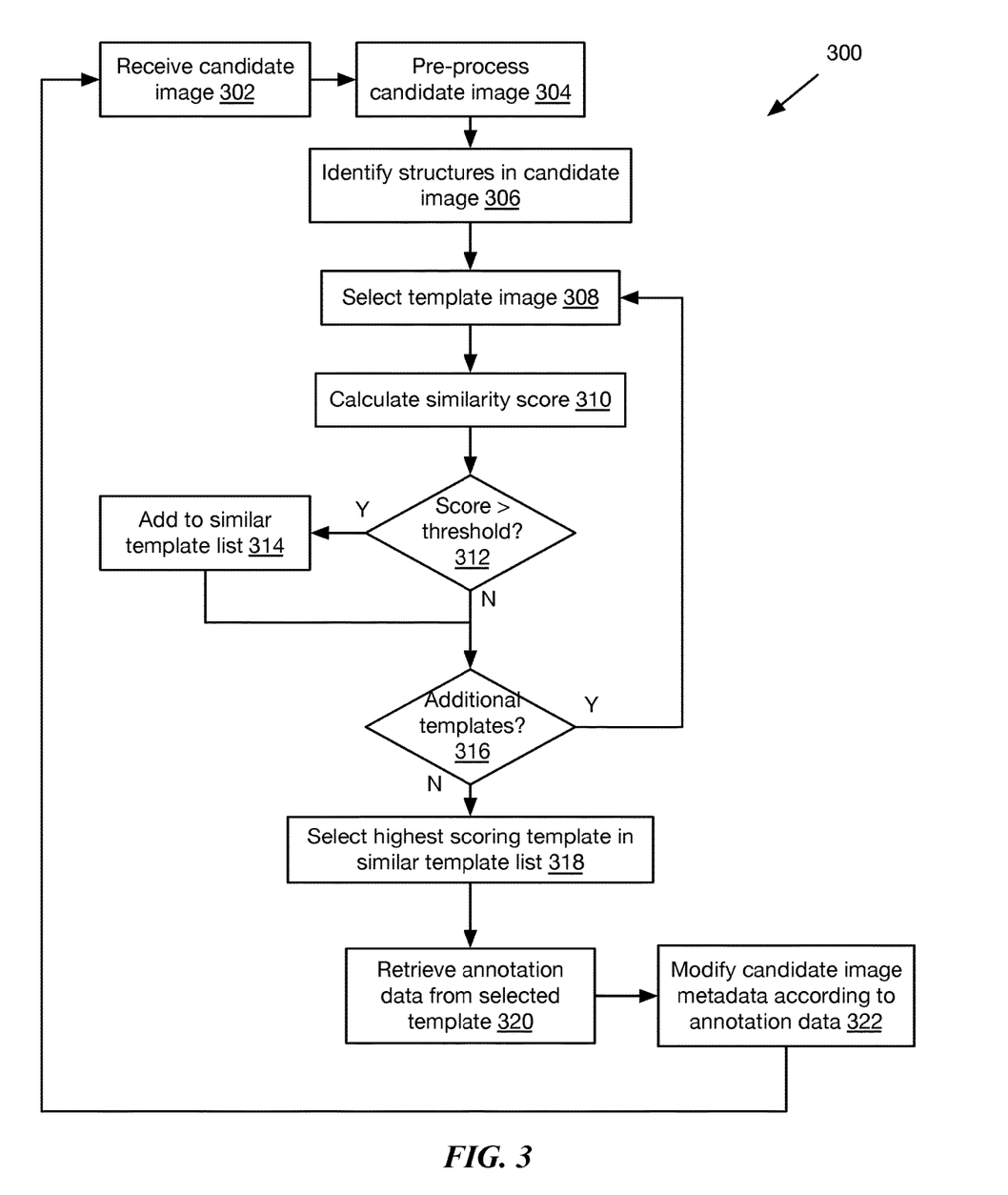
FIG. 3 is a flow chart of a method for automatic context-based annotation, according to some implementations.

FIG. 3 is a flow chart of a method 300 for automatic context-based annotation, according to some implementations. At step 302, a computing system may receive a candidate image. In some implementations, the computing system may receive a scan or capture of a document, while in other implementations, the computing system may receive a document (e.g. PDF document, word processing document, etc.) and may generate a candidate image of the document (e.g. rendering as or exporting the document to an image). The computing system may receive the document or candidate image from local storage, from remote storage or a network attached storage device, from a remote server (e.g.

application server) or another annotation server, or from a client device, or any other such means.

At step 304, in some implementations, the computing system may pre-process the candidate image. Pre-processing the candidate image may comprise scaling the candidate image to a predetermined size corresponding to a template size (e.g. 1500×1500 pixels, 1000×800 pixels, or any other such size); downscaling or converting the candidate image to grayscale; increasing or reducing a resolution of the candidate image to match a predetermined resolution or resolution of template images; cropping or padding the candidate image; applying a noise filter (e.g. a 5×5 Gaussian noise filter, or any other such value) or smoothing the image; or otherwise preparing the candidate image for feature selection.

At step 306, the computing system may identify structures in the candidate image. In some implementations, structures may be identified via an edge detection algorithm. For example, in some such implementations, the image may be filtered via a Sobel process or Laplacian process or other edge detector in both vertical and horizontal directions to generate an edge gradient in both directions for each pixel. A low pass filter or local maxima analysis may be applied to remove unwanted pixels, and hysteresis thresholding may be applied to remove false positives and identify true edges.

At step 308, in some implementations, a template image from a collection or a plurality of template images may be selected for comparison. As discussed above, the template images may have the same size, bit depth, and resolution as the pre-processed candidate image, and the same structural feature extraction discussed at step 306 may be applied to identify structures in the template image. Accordingly, at step 308, a pre-processed and feature-extracted or edge-detected template image from a plurality of template images may be selected for comparison to the candidate image.

At step 310, the computing system may calculate a similarity score between the candidate image and the template image. In some implementations, the similarity score may be calculated as a perceptual difference between the two images, as discussed above, e.g. as a weighted combination of averages, variances, and covariances of luminance, contrast, and structure within sliding windows or blocks across the images. In other implementations, other comparisons may be used, such as a mean-square error (MSE) between the candidate image and template image, or other such methods. The similarity score may be calculated with a range from 0 to 100%, or normalized to fall within this range, in many implementations.

At step 312 in some implementations, the computing system may determine whether the calculated score exceeds a threshold, such as 75%, 85%, or 90%. If so, then at step 314, an identification of the template image (or template) may be added to a similar template list. At step 316, the computing system may determine whether additional template images exist for comparison. If so, then steps 308-316 may be repeated iteratively for each additional template image.

As discussed above, in many implementations, the comparison steps 308-316 may be partitioned or distributed across a plurality of computing systems or servers in parallel. Accordingly, in such implementations, the candidate image (or processed and feature-extracted) candidate image may be provided to each system, and each system may perform steps 308-316 for different subsets of template images (either identified when the candidate image is provided, or according to a previously set distribution, such as a subset of template images in a local database of the corresponding server or system). The servers may provide their similar template lists and similarity scores to a host or controller system for aggregation, as discussed above.

At step 318, in some implementations, the computing system (or a controller system aggregating similar template lists from a plurality of comparing systems) may identify a highest scoring template in the similar template list. In implementations in which a threshold is utilized at step 312, if no similarity score exceeds the threshold, method 300 may exit and return an error or indication that no similar template was identified.

At step 320, the computing system may retrieve annotation data associated with the selected template. The annotation data may comprise identifications of locations of one or more annotation regions (e.g. by coordinates, dimensions, etc.). In some implementations, the annotation data may include annotation labels, such as "date", "address", "policy", etc. or any other such label. In some implementations, the annotation data may include an identification of a regular expression or filter for parsing alphanumeric characters within the annotation region according to an annotation-specific syntax (e.g. that a policy identifier should be n characters in length, and start with a letter; that an address should include a state identifier, zip code, common dividers such as line breaks or commas, etc.; or any other type and form of filter or parsing rules).

At step 322, the computing system may modify the candidate document and/or pre-processed or original candidate image according to the retrieved annotation data. In some implementations, the computing system may add visible highlighting, boxes, or other indicators to identify annotation regions within the candidate image; may add text labels according to the retrieved annotation data; and/or may perform optical character recognition within the annotation regions and, in some implementations, apply filters or regular expressions to parse the extracted characters. In some implementations, extracted characters may be added in association with corresponding annotation labels to metadata of the candidate document. In many implementations, the labeled and annotated document may be provided to a client device for review, editing (e.g. modification of extracted alphanumeric annotations, modification of labels, adjustment of annotation regions, etc.), or analysis. Edits to the annotations may be provided to the computing system from the client device, in some implementations, and stored in association with the labeled and annotated document (e.g. in metadata or associated data).

The systems and methods discussed herein may be utilized with any type and form of document, including any type and form of annotation. For example, these systems and methods may be used for identification and classification of annotations on medical records, mortgage documents, legal documents, financial documents, instructional documents, examination forms, journals, or any other type and form of document that conforms to a template or typical style (e.g. with specified regions for annotations or entries). In many implementations, such documents may be structured, semi-structured, or unstructured. Structured documents may include specified fields to be filled with particular values or codes with fixed or limited lengths, such as tax forms or similar records. Unstructured documents may fall into particular categories, but have few or no specified fields, and may comprise text or other data of any length, such as legal or mortgage documents, deeds, complaints, etc. Semi-structured documents may include a mix of structured and unstructured fields, with some fields having associated definitions or length limitations and other fields having no limits, such as invoices, policy documents, etc. Techniques that may be used to identify content in some documents, such as structured documents in which optical character recognition may be applied in predefined regions with associated definitions, may not work on semi-structured or unstructured documents.

In some implementations, annotated documents may be utilized as a training set for machine learning-based document identification or classification systems. For example, automatically annotated documents may be verified for accuracy in some implementations, and then provided as training data for a supervised learning system to be trained to recognize and classify other similar documents, including those without such annotations. As discussed above, implementations of the automatic annotation systems discussed herein may analyze structural features of documents; however, once annotations are identified and classified, other non-structural data from the document such as text, images, specific values within fields, etc. may be used to classify other documents that lack such structural features. For example, some annotations may be present on the first page of a multi-page document, but absent on other pages of the document (such as a form with multiple fields on a first page, and then subsequent pages left blank for additional text entry). Non-structural features of the annotated page such as grammar or syntax, word choices, embossing or stamps, watermarks, references to particular entities, etc. may be used to identify subsequent pages as related to the same document via a trained machine learning system, such as an artificial neural network or Bayesian classifier. These subsequent pages may then be associated with the same annotations of the annotated page or classified as related to the same document type.

The systems and methods discussed herein allow for disambiguation and identification of annotations regardless of location, even for similar documents (e.g. such as records of one type from one source compared to records of the same type from a different source, utilizing a different template to provide similar information). Unlike whole-document analysis and natural language processing or similar techniques, implementations of the systems and methods discussed herein may be significantly faster and more scalable, both by utilizing a priori templates for comparison with a limited set of features extracted from a document, and by partitioning such templates across a plurality of systems for comparison in parallel. Accordingly, implementations of these systems and methods provide an improvement in computer vision and document recognition and classification.

In one aspect, the present disclosure is directed to a method for automatic context-based document annotation. The method includes receiving, by a computing system, a candidate image of a document for annotation identification. The method also includes detecting, by the computing system, a set of structural features of the candidate image. The method also includes, for each of a plurality of template images, calculating, by the computing system, a similarity score between structural features of the template image and the detected set of structural features. The method also includes selecting, by the computing system, a template image having a highest similarity score. The method also includes populating, by the computing system, the candidate image with one or more annotation labels according to a corresponding one or more annotation labels of the selected template image.

In some implementations, the method includes scaling the candidate image to a size corresponding to a size of the template images. In some implementations, the method includes filtering noise from the candidate image according to a predetermined window; and detecting horizontal and vertical edges within the noise-filtered candidate image. In a further implementation, the method includes, for each pixel, determining a horizontal and vertical edge gradient; filtering pixels according to a local maxima; and applying hysteresis thresholding to the filtered pixels. In another further implementation, the method includes detecting horizontal and vertical edges within each template image of the plurality of template images; and calculating the similarity score between the structural features of each template image and the detected set of structural features further comprises determining a correlation coefficient between the structural features of each template image and the detected set of structural features.

In some implementations, the method includes providing, to each of an additional one or more computing devices, the candidate image and an identification of a subset of template images; and receiving, from each of the additional one or more computing devices, a similarity score between the candidate image and each template image of the corresponding subset of template images.

In some implementations, the method includes, for each of the one or more annotation labels, retrieving coordinates and dimensions of the annotation label within the selected template image. In a further implementation, the method includes, for each of the one or more annotation labels: extracting alphanumeric text from the candidate image within the retrieved coordinates and dimensions of the annotation label; and adding the extracted alphanumeric text to metadata of the candidate image in association with an identification of the annotation label. In another further implementation, the method includes applying optical character recognition to a portion of the candidate image within the retrieved coordinates and dimensions. In another further implementation, the method includes receiving a modification to the extracted alphanumeric text; and storing the modified alphanumeric text in metadata of the candidate image.

In another aspect, the present application is directed to a system for automatic context-based document annotation. The system includes a first computing system comprising a processor executing an annotation classifier. The annotation classifier is configured to: receive a candidate image of a document for annotation identification; detect a set of structural features of the candidate image; for each of a plurality of template images, calculate a similarity score between structural features of the template image and the detected set of structural features; select a template image having a highest similarity score; and populate the candidate image with one or more annotation labels according to a corresponding one or more annotation labels of the selected template image.

In some implementations, the annotation classifier is further configured to scale the candidate image to a size corresponding to a size of the template images. In some implementations, the annotation classifier is further configured to filter noise from the candidate image according to a predetermined window; and detect horizontal and vertical edges within the noise-filtered candidate image. In a further implementation, the annotation classifier is further configured to detect horizontal and vertical edges by: for each pixel, determining a horizontal and vertical edge gradient; filtering pixels according to a local maxima; and applying hysteresis thresholding to the filtered pixels. In another further implementation, the annotation classifier is further configured to detect horizontal and vertical edges within each template image of the plurality of template images; and calculating the similarity score between the structural features of each template image and the detected set of structural features further comprises determining a correlation coefficient between the structural features of each template image and the detected set of structural features.

In some implementations, the annotation classifier is further configured to: provide, to each of an additional one or more computing devices, the candidate image and an identification of a subset of template images; and receive, from each of the additional one or more computing devices, a similarity score between the candidate image and each template image of the corresponding subset of template images.

In some implementations, the annotation classifier is further configured to, for each of the one or more annotation labels, retrieving coordinates and dimensions of the annotation label within the selected template image. In a further implementation, the annotation classifier is further configured to, for each of the one or more annotation labels: extract alphanumeric text from the candidate image within the retrieved coordinates and dimensions of the annotation label; and add the extracted alphanumeric text to metadata of the candidate image in association with an identification of the annotation label. In a still further implementation, the annotation classifier is further configured to apply optical character recognition to a portion of the candidate image within the retrieved coordinates and dimensions. In another still further implementation, the annotation classifier is further configured to receive a modification to the extracted alphanumeric text; and store the modified alphanumeric text in metadata of the candidate image.

B. Computing Environment

Having discussed specific embodiments of the present solution, it may be helpful to describe aspects of the operating environment as well as associated system components (e.g., hardware elements) in connection with the methods and systems described herein.

Figure 4A:
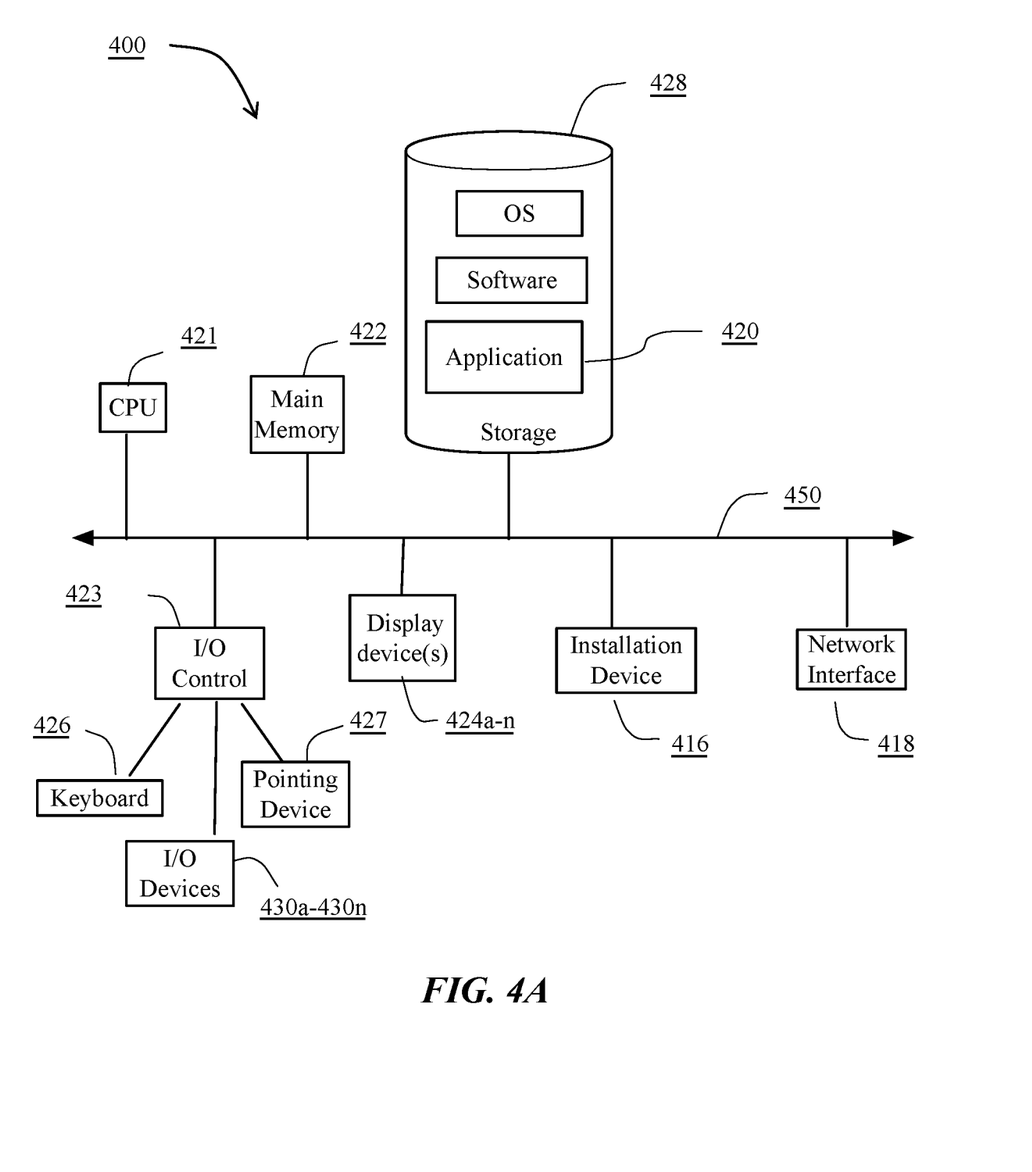
FIGS. 4A and 4B are block diagrams depicting embodiments of computing devices useful in connection with the methods and systems described herein.
Figure 4B:
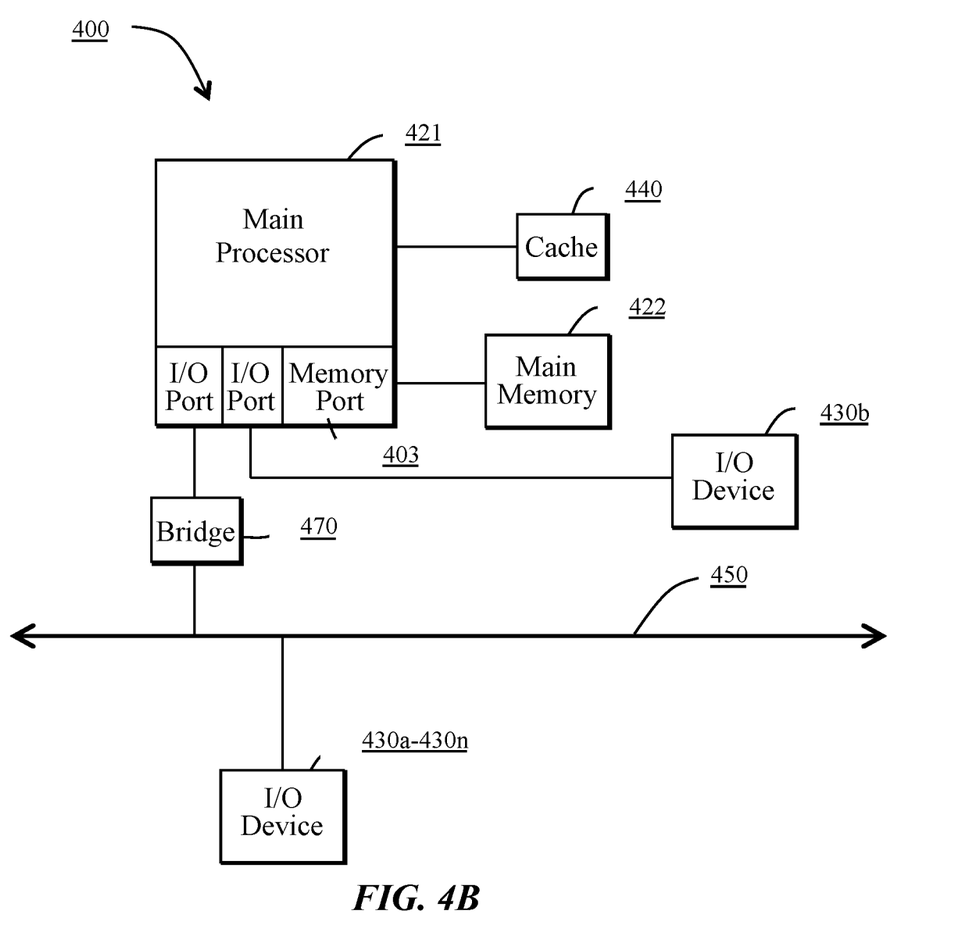

The systems discussed herein may be deployed as and/or executed on any type and form of computing device, such as a computer, network device or appliance capable of communicating on any type and form of network and performing the operations described herein. FIGS. 4A and 4B depict block diagrams of a computing device 400 useful for practicing an embodiment of the wireless communication devices 402 or the access point 406. As shown in FIGS. 4A and 4B, each computing device 400 includes a central processing unit 421, and a main memory unit 422. As shown in FIG. 4A, a computing device 400 may include a storage device 428, an installation device 416, a network interface 418, an I/O controller 423, display devices 424a-424n, a keyboard 426 and a pointing device 427, such as a mouse. The storage device 428 may include, without limitation, an operating system and/or software. As shown in FIG. 4B, each computing device 400 may also include additional optional elements, such as a memory port 403, a bridge 470, one or more input/output devices 430a-430n (generally referred to using reference numeral 430), and a cache memory 440 in communication with the central processing unit 421.

The central processing unit 421 is any logic circuitry that responds to and processes instructions fetched from the main memory unit 422. In many embodiments, the central processing unit 421 is provided by a microprocessor unit, such as: those manufactured by Intel Corporation of Mountain View, Calif.; those manufactured by International Business Machines of White Plains, N.Y.; or those manufactured by Advanced Micro Devices of Sunnyvale, Calif. The computing device 400 may be based on any of these processors, or any other processor capable of operating as described herein. Although referred to as a central processing unit or CPU, in many implementations, the processing unit may comprise a graphics processing unit or GPU (which may be useful not just for graphics processing, but for the types of parallel calculations frequently required for neural networks or other machine learning systems), a tensor processing unit or TPU (which may comprise a machine learning accelerating application-specific integrated circuit (ASIC), or other such processing units. In many implementations, a system may comprise a plurality of processing devices of different types (e.g. one or more CPUs, one or more GPUs, and/or one or more TPUs). Processing devices may also be virtual processors (e.g. vCPUs) provided by a virtual machine managed by a hypervisor of a physical computing device and deployed as a service or cloud or in similar architectures.

Main memory unit 422 may be one or more memory chips capable of storing data and allowing any storage location to be directly accessed by the microprocessor 421, such as any type or variant of Static random access memory (SRAM), Dynamic random access memory (DRAM), Ferroelectric RAM (FRAM), NAND Flash, NOR Flash and Solid State Drives (SSD). The main memory 422 may be based on any of the above described memory chips, or any other available memory chips capable of operating as described herein. In the embodiment shown in FIG. 4A, the processor 421 communicates with main memory 422 via a system bus 450 (described in more detail below). FIG. 4B depicts an embodiment of a computing device 400 in which the processor communicates directly with main memory 422 via a memory port 403. For example, in FIG. 4B the main memory 422 may be DRDRAM.

FIG. 4B depicts an embodiment in which the main processor 421 communicates directly with cache memory 440 via a secondary bus, sometimes referred to as a backside bus. In other embodiments, the main processor 421 communicates with cache memory 440 using the system bus 450. Cache memory 440 typically has a faster response time than main memory 422 and is provided by, for example, SRAM, BSRAM, or EDRAM. In the embodiment shown in FIG. 4B, the processor 421 communicates with various I/O devices 430 via a local system bus 450. Various buses may be used to connect the central processing unit 421 to any of the I/O devices 430, for example, a VESA VL bus, an ISA bus, an EISA bus, a MicroChannel Architecture (MCA) bus, a PCI bus, a PCI-X bus, a PCI-Express bus, or a NuBus. For embodiments in which the I/O device is a video display 424, the processor 421 may use an Advanced Graphics Port (AGP) to communicate with the display 424. FIG. 4B depicts an embodiment of a computer 400 in which the main processor 421 may communicate directly with I/O device 430b, for example via HYPERTRANSPORT, RAPIDIO, or INFINIBAND communications technology. FIG. 4B also depicts an embodiment in which local busses and direct communication are mixed: the processor 421 communicates with I/O device 430a using a local interconnect bus while communicating with I/O device 430b directly.

A wide variety of I/O devices 430a-430n may be present in the computing device 400. Input devices include keyboards, mice, trackpads, trackballs, microphones, dials, touch pads, touch screen, and drawing tablets. Output devices include video displays, speakers, inkjet printers, laser printers, projectors and dye-sublimation printers. The I/O devices may be controlled by an I/O controller 423 as shown in FIG. 4A. The I/O controller may control one or more I/O devices such as a keyboard 426 and a pointing device 427, e.g., a mouse or optical pen. Furthermore, an I/O device may also provide storage and/or an installation medium 416 for the computing device 400. In still other embodiments, the computing device 400 may provide USB connections (not shown) to receive handheld USB storage devices such as the USB Flash Drive line of devices manufactured by Twintech Industry, Inc. of Los Alamitos, Calif.

Referring again to FIG. 4A, the computing device 400 may support any suitable installation device 416, such as a disk drive, a CD-ROM drive, a CD-R/RW drive, a DVD-ROM drive, a flash memory drive, tape drives of various formats, USB device, hard-drive, a network interface, or any other device suitable for installing software and programs. The computing device 400 may further include a storage device, such as one or more hard disk drives or redundant arrays of independent disks, for storing an operating system and other related software, and for storing application software programs such as any program or software 420 for implementing (e.g., configured and/or designed for) the systems and methods described herein. Optionally, any of the installation devices 416 could also be used as the storage device. Additionally, the operating system and the software can be run from a bootable medium.

Furthermore, the computing device 400 may include a network interface 418 to interface to the network 404 through a variety of connections including, but not limited to, standard telephone lines, LAN or WAN links (e.g., 802.11, T1, T3, 56 kb, X.25, SNA, DECNET), broadband connections (e.g., ISDN, Frame Relay, ATM, Gigabit Ethernet, Ethernet-over-SONET), wireless connections, or some combination of any or all of the above. Connections can be established using a variety of communication protocols (e.g., TCP/IP, IPX, SPX, NetBIOS, Ethernet, ARCNET, SONET, SDH, Fiber Distributed Data Interface (FDDI), RS232, IEEE 802.11, IEEE 802.11a, IEEE 802.11b, IEEE 802.11g, IEEE 802.11n, IEEE 802.11ac, IEEE 802.11ad, CDMA, GSM, WiMax and direct asynchronous connections). In one embodiment, the computing device 400 communicates with other computing devices 400' via any type and/or form of gateway or tunneling protocol such as Secure Socket Layer (SSL) or Transport Layer Security (TLS). The network interface 418 may include a built-in network adapter, network interface card, PCMCIA network card, card bus network adapter, wireless network adapter, USB network adapter, modem or any other device suitable for interfacing the computing device 400 to any type of network capable of communication and performing the operations described herein.

In some embodiments, the computing device 400 may include or be connected to one or more display devices 424a-424n. As such, any of the I/O devices 430a-430n and/or the I/O controller 423 may include any type and/or form of suitable hardware, software, or combination of hardware and software to support, enable or provide for the connection and use of the display device(s) 424a-424n by the computing device 400. For example, the computing device 400 may include any type and/or form of video adapter, video card, driver, and/or library to interface, communicate, connect or otherwise use the display device(s) 424a-424n. In one embodiment, a video adapter may include multiple connectors to interface to the display device(s) 424a-424n. In other embodiments, the computing device 400 may include multiple video adapters, with each video adapter connected to the display device(s) 424a-424n. In some embodiments, any portion of the operating system of the computing device 400 may be configured for using multiple displays 424a-424n. One ordinarily skilled in the art will recognize and appreciate the various ways and embodiments that a computing device 400 may be configured to have one or more display devices 424a-424n.

In further embodiments, an I/O device 430 may be a bridge between the system bus 450 and an external communication bus, such as a USB bus, an Apple Desktop Bus, an RS-232 serial connection, a SCSI bus, a FireWire bus, a FireWire 800 bus, an Ethernet bus, an AppleTalk bus, a Gigabit Ethernet bus, an Asynchronous Transfer Mode bus, a FibreChannel bus, a Serial Attached small computer system interface bus, a USB connection, or a HDMI bus.

A computing device 400 of the sort depicted in FIGS. 4A and 4B may operate under the control of an operating system, which control scheduling of tasks and access to system resources. The computing device 400 can be running any operating system such as any of the versions of the MICROSOFT WINDOWS operating systems, the different releases of the Unix and Linux operating systems, any version of the MAC OS for Macintosh computers, any embedded operating system, any real-time operating system, any open source operating system, any proprietary operating system, any operating systems for mobile computing devices, or any other operating system capable of running on the computing device and performing the operations described herein. Typical operating systems include, but are not limited to: Android, produced by Google Inc.; WINDOWS 7 and 8, produced by Microsoft Corporation of Redmond, Wash.; MAC OS, produced by Apple Computer of Cupertino, Calif.; WebOS, produced by Research In Motion (RIM); OS/2, produced by International Business Machines of Armonk, N.Y.; and Linux, a freely-available operating system distributed by Caldera Corp. of Salt Lake City, Utah, or any type and/or form of a Unix operating system, among others.

The computer system 400 can be any workstation, telephone, desktop computer, laptop or notebook computer, server, handheld computer, mobile telephone or other portable telecommunications device, media playing device, a gaming system, mobile computing device, or any other type and/or form of computing, telecommunications or media device that is capable of communication. The computer system 400 has sufficient processor power and memory capacity to perform the operations described herein.

In some embodiments, the computing device 400 may have different processors, operating systems, and input devices consistent with the device. For example, in one embodiment, the computing device 400 is a smart phone, mobile device, tablet or personal digital assistant. In still other embodiments, the computing device 400 is an Android-based mobile device, an iPhone smart phone manufactured by Apple Computer of Cupertino, Calif., or a Blackberry or WebOS-based handheld device or smart phone, such as the devices manufactured by Research In Motion Limited. Moreover, the computing device 400 can be any workstation, desktop computer, laptop or notebook computer, server, handheld computer, mobile telephone, any other computer, or other form of computing or telecommunications device that is capable of communication and that has sufficient processor power and memory capacity to perform the operations described herein.

In some implementations, software functionality or executable logic for execution by one or more processors of the system may be provided in any suitable format. For example, in some implementations, logic instructions may be provided as native executable code, as instructions for a compiler of the system, or in a package or container for deployment on a virtual computing system (e.g. a Docker container, a Kubernetes Engine (GKE) container, or any other type of deployable code). Containers may comprise standalone packages comprising all of the executable code necessary to run an application, including code for the application itself, code for system tools or libraries, preferences, settings, assets or resources, or other features. In many implementations, containers may be platform or operating system agnostic. In some implementations, a docker engine executed by a single host operating system and underlying hardware may execute a plurality of containerized applications, reducing resources necessary to provide the applications relative to virtual machines for each application (each of which may require a guest operating system). Although the disclosure may reference one or more "users", such "users" may refer to user-associated devices or stations (STAs), for example, consistent with the terms "user" and "multi-user" typically used in the context of a multi-user multiple-input and multiple-output (MU-MIMO) environment.

Although examples of communications systems described above may include devices and APs operating according to an 802.11 standard, it should be understood that embodiments of the systems and methods described can operate according to other standards and use wireless communications devices other than devices configured as devices and APs. For example, multiple-unit communication interfaces associated with cellular networks, satellite communications, vehicle communication networks, and other non-802.11 wireless networks can utilize the systems and methods described herein to achieve improved overall capacity and/or link quality without departing from the scope of the systems and methods described herein.

It should be noted that certain passages of this disclosure may reference terms such as "first" and "second" in connection with devices, mode of operation, transmit chains, antennas, etc., for purposes of identifying or differentiating one from another or from others. These terms are not intended to merely relate entities (e.g., a first device and a second device) temporally or according to a sequence, although in some cases, these entities may include such a relationship. Nor do these terms limit the number of possible entities (e.g., devices) that may operate within a system or environment.

It should be understood that the systems described above may provide multiple ones of any or each of those components and these components may be provided on either a standalone machine or, in some embodiments, on multiple machines in a distributed system. In addition, the systems and methods described above may be provided as one or more computer-readable programs or executable instructions embodied on or in one or more articles of manufacture. The article of manufacture may be a floppy disk, a hard disk, a CD-ROM, a flash memory card, a PROM, a RAM, a ROM, or a magnetic tape. In general, the computer-readable programs may be implemented in any programming language, such as LISP, PERL, C, C++, C#, PROLOG, or in any byte code language such as JAVA. The software programs or executable instructions may be stored on or in one or more articles of manufacture as object code.

While the foregoing written description of the methods and systems enables one of ordinary skill to make and use what is considered presently to be the best mode thereof, those of ordinary skill will understand and appreciate the existence of variations, combinations, and equivalents of the specific embodiment, method, and examples herein. The present methods and systems should therefore not be limited by the above described embodiments, methods, and examples, but by all embodiments and methods within the scope and spirit of the disclosure.

We claim:

1. A method for automatic context-based document annotation, comprising:
   receiving, by a computing system, a candidate image of a document for annotation identification;
   detecting, by the computing system, a set of structural features of the candidate image;
   for each of a plurality of template images, calculating, by the computing system, a similarity score between structural features of the template image and the detected set of structural features by determining a correlation coefficient between the structural features of each template image and the detected set of structural features, the correlation coefficient comprising a weighted combination of luminance, contrast, and structure comparisons for each of a plurality of portions of the template image and the detected set of structural features of the candidate image;
   selecting, by the computing system, a template image having a highest similarity score; and
   adding, by the computing system to the candidate image, one or more annotation labels according to a corresponding one or more annotation labels of the selected template image.

2. The method of claim 1, further comprising scaling the candidate image to a size corresponding to a size of the template images.

3. The method of claim 1, wherein detecting the set of structural features comprises filtering noise from the candidate image according to a predetermined window; and detecting horizontal and vertical edges within the noise-filtered candidate image.

4. The method of claim 3, wherein detecting horizontal and vertical edges further comprises:
   for each pixel, determining a horizontal and vertical edge gradient;
   filtering pixels according to a local maxima; and
   applying hysteresis thresholding to the filtered pixels.

5. The method of claim 3, further comprising:
   detecting horizontal and vertical edges within each template image of the plurality of template images.

6. The method of claim 1, wherein calculating the similarity score between the structural features of each template image and the detected set of structural features further comprises:
   providing, to each of an additional one or more computing devices, the candidate image and an identification of a subset of template images; and
   receiving, from each of the additional one or more computing devices, a similarity score between the candidate image and each template image of the corresponding subset of template images.

7. The method of claim 1, wherein populating the candidate image with one or more annotation labels further comprises, for each of the one or more annotation labels, retrieving coordinates and dimensions of the annotation label within the selected template image.

8. The method of claim 7, further comprising, for each of the one or more annotation labels:
   extracting alphanumeric text from the candidate image within the retrieved coordinates and dimensions of the annotation label; and adding the extracted alphanumeric text to metadata of the candidate image in association with an identification of the annotation label.

9. The method of claim 8, wherein extracting alphanumeric text comprises applying optical character recognition to a portion of the candidate image within the retrieved coordinates and dimensions.

10. The method of claim 8, further comprising receiving a modification to the extracted alphanumeric text; and storing the modified alphanumeric text in metadata of the candidate image.

11. A system for automatic context-based document annotation, comprising:
- a first computing system comprising a processor executing an annotation classifier, wherein the annotation classifier is configured to:
  - receive a candidate image of a document for annotation identification;
  - detect a set of structural features of the candidate image;
  - for each of a plurality of template images, calculate a similarity score between structural features of the template image and the detected set of structural features by determining a correlation coefficient between the structural features of each template image and the detected set of structural features, the correlation coefficient comprising a weighted combination of luminance, contrast, and structure comparisons for each of a plurality of portions of the template image and the detected set of structural features of the candidate image;
  - select a template image having a highest similarity score; and
  - add, to the candidate image, one or more annotation labels according to a corresponding one or more annotation labels of the selected template image.

12. The system of claim 11, wherein the annotation classifier is further configured to scale the candidate image to a size corresponding to a size of the template images.

13. The system of claim 11, wherein the annotation classifier is further configured to filter noise from the candidate image according to a predetermined window; and detect horizontal and vertical edges within the noise-filtered candidate image.

14. The system of claim 13, wherein the annotation classifier is further configured to detect horizontal and vertical edges by:
- for each pixel, determining a horizontal and vertical edge gradient;
- filtering pixels according to a local maxima; and
- applying hysteresis thresholding to the filtered pixels.

15. The system of claim 13, wherein the annotation classifier is further configured to detect horizontal and vertical edges within each template image of the plurality of template images.

16. The system of claim 11, wherein the annotation classifier is further configured to:
- provide, to each of an additional one or more computing devices, the candidate image and an identification of a subset of template images; and
- receive, from each of the additional one or more computing devices, a similarity score between the candidate image and each template image of the corresponding subset of template images.

17. The system of claim 11, wherein the annotation classifier is further configured to, for each of the one or more annotation labels, retrieve coordinates and dimensions of the annotation label within the selected template image.

18. The system of claim 17, wherein the annotation classifier is further configured to, for each of the one or more annotation labels:
- extract alphanumeric text from the candidate image within the retrieved coordinates and dimensions of the annotation label; and
- add the extracted alphanumeric text to metadata of the candidate image in association with an identification of the annotation label.

19. The system of claim 18, wherein the annotation classifier is further configured to apply optical character recognition to a portion of the candidate image within the retrieved coordinates and dimensions.

20. The system of claim 18, wherein the annotation classifier is further configured to receive a modification to the extracted alphanumeric text; and store the modified alphanumeric text in metadata of the candidate image.

* * * * *